United States Patent
Linke

(10) Patent No.: US 12,451,110 B2
(45) Date of Patent: Oct. 21, 2025

(54) SOUND REDUCER

(71) Applicant: Umfotec Acoustic Solutions GmbH, Northeim (DE)

(72) Inventor: Berend Linke, Noerten-Hardenberg (DE)

(73) Assignee: Umfotec Acoustic Solutions GmbH, Northeim (DE)

( * ) Notice: Subject to any disclaimer, the term of this patent is extended or adjusted under 35 U.S.C. 154(b) by 273 days.

(21) Appl. No.: 18/132,506

(22) Filed: Apr. 10, 2023

(65) Prior Publication Data
US 2023/0343316 A1    Oct. 26, 2023

(30) Foreign Application Priority Data
Apr. 22, 2022  (DE) ..................... 10 2022 109 764.1

(51) Int. Cl.
*G10K 11/172* (2006.01)
*G10K 11/162* (2006.01)

(52) U.S. Cl.
CPC .......... *G10K 11/172* (2013.01); *G10K 11/162* (2013.01)

(58) Field of Classification Search
CPC . F16L 55/0331; G10K 11/172; G10K 11/162; G10K 11/161; F01N 1/02
USPC ......................................... 181/251, 212–241
See application file for complete search history.

(56) References Cited

U.S. PATENT DOCUMENTS

| | | | | |
|---|---|---|---|---|
| 1,575,657 A | * | 3/1926 | Straussler | F01N 1/10 181/258 |
| 2,990,906 A | * | 7/1961 | Audette | F01N 1/10 181/256 |
| 3,114,431 A | * | 12/1963 | Sanders | F01N 1/04 181/256 |
| 4,135,600 A | * | 1/1979 | Ogi | H04R 1/2826 181/156 |
| 5,513,266 A | * | 4/1996 | Zuroski | G10K 11/17857 381/71.7 |
| 6,116,375 A | | 9/2000 | Lorch et al. | |
| 6,332,511 B1 | * | 12/2001 | Parlato | G10K 11/161 181/282 |
| 8,307,947 B2 | * | 11/2012 | Bussow | F16L 55/0331 181/212 |
| 9,399,436 B2 | * | 7/2016 | Brunberg | B60R 13/0846 |

(Continued)

FOREIGN PATENT DOCUMENTS

DE       19825543       12/1999
DE    102004049446 A1    4/2006
(Continued)

OTHER PUBLICATIONS

German Office Action dated Dec. 12, 2022.

*Primary Examiner* — Forrest M Phillips
*Assistant Examiner* — Joseph James Peter Illicete
(74) *Attorney, Agent, or Firm* — Gerald E. Hespos; Michael J. Porco

(57) ABSTRACT

A sound reducer (1) has a main pipe (10) and an annular chamber (40) that surrounds the main pipe (10). The annular chamber (40) is connected to the interior of the main pipe (10) in a sound-conducting manner via at least one first window (11) while being closed otherwise. Thus, the annular chamber (40) acts as a resonator chamber. A flow-around body (20) is arranged in the interior of the main pipe (10) and is fixed to the inner wall of the main pipe (10) by struts (30; 130, 230).

18 Claims, 2 Drawing Sheets

(56) References Cited

U.S. PATENT DOCUMENTS

2002/0121404 A1    9/2002   Storm
2021/0207508 A1*   7/2021   Linke ................... G10K 11/172

FOREIGN PATENT DOCUMENTS

| DE | 202016008580 U1 | 7/2018 |
| DE | 102017126125 | 5/2019 |
| GB | 678344 | 9/1952 |

* cited by examiner

SOUND REDUCER

BACKGROUND

Field of Invention

The invention relates to a sound reducer with a main pipe and an annular chamber that surrounds the main pipe and is connected to the interior of the main pipe in a sound-conducting manner via at least one window while being closed otherwise. Thus, the annular chamber acts as a resonator chamber.

State of the Art

DE 10 2017 126 125 A1 discloses a sound reducer comprising a main pipe and an annular chamber that surrounds the main pipe. The annular chamber is connected to the interior of the main pipe in a sound-conducting manner via at least one window while being closed otherwise. Thus, the annular chamber functions as a resonator chamber.

Resonance-based sound reduction in fluid lines has been known to those skilled in the art for a long time. A sound reducer based on this principle has a main pipe, and a (liquid or gaseous) fluid flows through a main pipe. Sound waves propagate in the fluid. A larger-diameter pipe section usually is arranged concentrically around the main pipe so that a circumferential annular gap is formed between this outer pipe and the more inwardly disposed main pipe. End walls are provided at the ends of the outer pipe and are connected tightly to the wall of the main pipe so that a closed annular chamber is formed between the main pipe and the outer pipe. This annular chamber communicates with the interior of the main pipe in a sound-conducting manner and possibly in a fluid conducting manner via one or more windows in the main pipe. For the sake of simplicity, the present description will refer to "an annular chamber surrounding the main pipe". However, the person skilled in the art will understand that this does not imply any limitation to a single resonator chamber that is continuous in the circumferential direction and fully surrounds the main pipe. Rather, the annular chamber may circumferentially circumvent the main pipe incompletely and/or the annular chamber may be subdivided by inner axial walls into several partial chambers that are adjacent in circumferential view and/or several axially adjacent annular chambers may be provided. In any case, sound propagating in the main pipe enters the annular chamber through the window(s) and is reflected several times by walls of the annular chamber. An annular chamber and window that are dimensioned suitably result in destructive superposition of the reflected sound waves, i.e. in sound reduction. Such sound reducers are also known as Helmholtz resonators. The above-mentioned DE 10 2017 126 125 A1 teaches that the windows are filled with a preferably open-pored foam (this term is used in the context of the present description in the sense of a foam body). The foam allows the fluid and the sound to be transported therein, but the sound undergoes additional attenuation in the sense of sound reduction by energy dissipation. Sound reducers based on this combination principle of resonance and absorption are designated by the assignee of this invention with the registered trademark RESABTOR®.

Problems can arise if particularly high-frequency sound components are reduced. It has been shown that known sound reducers reduce higher frequencies less efficiently than lower frequencies. This has proven to be disadvantageous for broadband tuning of the sound reducers.

An object of the invention is to provide a sound reducer that also is effective for higher frequencies and that can be manufactured in a technically simple and inexpensive manner.

SUMMARY OF THE INVENTION

The invention relates to a sound reducer that comprises a main pipe and an annular chamber. The annular chamber surrounds the main pipe and is connected to the interior of the main pipe in a sound-conducting manner via at least one window while being closed otherwise. Thus, the annular chamber acts as a resonator chamber. A flow-around body, i.e. a body around which the fluid can flow on all sides, is arranged in the interior of the main pipe and is fixed to the inner wall of the main pipe by struts so that fluid can flow around the flow-around body on all sides.

Thus, the sound-reducer of the invention places a "torpedo"-type flow-around body in the area of the sound reducer inside the main pipe. This configuration immediately leads to a significant improvement in sound reduction at higher frequencies. The inventor has identified the mode structure of sound wave propagation as the cause of this phenomenon. As is known to those skilled in the art, sound propagates in pipes in so-called modes that can be described by the shape of the standing waves that form in the process. The cut-off frequencies at which certain higher modes "kick in" depend strongly on the geometry and dimensioning of the pipes. However, it is immediately obvious that at higher frequencies, i.e. shorter wavelengths, a larger number of modes can be generated in a given space, and some of those modes have very complex shapes. This can be described particularly clearly using the so-called double-ring mode where the sound propagates largely independently in two concentric radial regions of the main pipe. Only the outer radial region comes into contact with the effective structures of conventional sound reducers. Thus, only sound transported in the outer radial region of the pipe can enter the resonator chamber through the first window(s) and thus be subjected to destructive resonance and, if necessary, additional absorption. Sound transported in the inner radial region of the main pipe, on the other hand, undergoes virtually no interaction with the effective structures of conventional sound reducers. However, the "torpedo" disclosed herein blocks this inner radial region of the main pipe. The corresponding double-ring mode is thus disturbed or cannot "kick in" due to the disturbing structure. This leads to sound transport exclusively in the outer radial region of the main pipe, which interacts with the effective elements of the sound reducer in the manner explained above. In this way, sound can be reduced effectively even at comparatively high frequencies.

The general approach described above is highly advantageous from a physical point of view, and encounters fewer technical difficulties than economic difficulties in practical implementation. It is readily conceivable to insert a flow-around body with outward-facing struts into the main pipe and to join the free ends of the struts to the inner wall of the main pipe, for example by welding or bolting. However, this is complex and expensive. The construction of the sound reducer is complicated further in cases where the struts must contact the main pipe within the axial extent of the resonator chamber, for example, for reasons of space. Accordingly, a further development of this disclosure provides that the main pipe comprises a first main pipe axial section and a second main pipe axial section, and the flow-around body comprises a first flow-around body axial section and a second flow-around body axial section. The first main pipe axial section together with the axially corresponding first flow-around body axial section and a first set of struts integrally form a one-piece first sound reducer axial section. Similarly, the second main pipe axial section together with the axially corresponding second flow-around body axial section and a second set of struts integrally form a one-piece second sound reducer axial section. In other words, for the purpose of economic feasibility, a functional, radial subdivision of the sound reducer is abandoned and instead a functionally completely counterintuitive, axial subdivision is made. In some embodiments, the main pipe and the flow-around body are divided into two axial sections, with the corresponding axial sections of the main pipe and flow-around body being formed in one piece. In each case, a set of struts, also formed in one piece with the axial sections, function to connect the respective main pipe axial section and flow-around body axial section. Each of the two resulting sound reducer axial sections can be manufactured inexpensively, in particular as a plastic injection molded part. Assembly is achieved by simply plugging the two sound reducer axial sections axially together to form the sound reducer of the invention, with the two main pipe axial sections assembling to form the main pipe and the two flow-around body sections assembling to form the flow-around body.

The annular chamber of some embodiments is composed of a first annular chamber axial section and a second annular chamber axial section. The first annular chamber axial section is formed as an additional element of the one-piece first sound reducer axial section, and the second annular chamber axial section is formed as an additional element of the one-piece second sound reducer axial section. In other words, the annular chamber is included in the explained concept of axial bipartition. Thus, in this embodiment, the first sound reducer axial section comprises the first flow around body axial section, the first set of struts, the first main pipe axial section, and the first annular chamber axial section, with all of these components being formed together as a single piece. The same applies to the second sound reducer axial section. Thus, the second flow-around body axial section, the second set of struts, the second main pipe axial section and the second annular chamber axial section may be formed together as a single piece.

The explained concept can be used both for a sound reducer designed as a pure resonator and for a sound reducer based on the combination principle of resonance and absorption, such as those sold by the assignee of the invention under the registered trademark RESABTOR®. In the latter case, the at least one first window of the main pipe is filled with a first plate of preferably open-pored foam. With regard to the physical mode of operation, reference is made to the explanations in the introductory part of this description.

In some embodiments, including those where the sound reducer operates on the principle of resonance and absorption, such as the assignee's RESABTOR® brand of sound reducer, the at least one first window of the main pipe may be a first gap arranged between the two main pipe axial sections. This gap may extend over the complete circumference of the main pipe. In a further embodiment of this approach, the first foam plate may be an open-pored foam formed as a first hollow foam cylinder bridging the first gap while held in coaxial orientation between the two main pipe axial sections. Thus. this embodiment of the sound reducer may comprise two sound reducer axial sections and a hollow foam cylinder inserted between the two sound reducer axial sections when the two sound reducer axial sections are plugged together. Thus, the gap between the two main pipe axial sections given by the first window is bridged in the axial direction by the hollow foam cylinder inserted when they are plugged together. With this design, the foam hollow cylinder represents a center section of the main pipe in the final assembly state.

This latter embodiment can be achieved in a technically favorable manner by holding the first hollow foam cylinder axially on both axial ends in a form-fitting manner in an annular groove located on one of the end faces of the corresponding main pipe axial section that is facing the first hollow foam cylinder. During assembly, the hollow foam cylinder can already be inserted into the annular groove of one of the two sound reducer axial sections, in particular in its main pipe axial section. The other sound reducer axial section then is plugged on in such a way that the still free edge of the hollow foam cylinder engages in the annular groove of the sound reducer axial section, in particular in the annular groove of its main pipe axial section.

Instead of a first window completely surrounding the main pipe, plural first windows may be spaced apart in the circumferential direction. These windows can be filled in an analogous manner by first foam plates of preferably open-pored foam that can be inserted in advance.

To avoid edges that could cause turbulence in the fluid inside the sound reducer, the end faces of the two flow-around body axial sections have corresponding form-fit structures that together form an (at least radial) form-fit connection of the two flow-around body axial sections to form the flow-around body. For example, these structures may be corresponding ring shoulders. In this embodiment, the form-fit structures secure only in the radial direction. However, more complicated designs are conceivable in which the form-fit structures represent a snap-in connection that also provides axial securing.

Turbulence also can be avoided by forming the flow around body to have a streamlined profile in longitudinal section along the longitudinal axis of the main pipe. The streamlined profile may extend at least over the axial length of the resonator chamber. This design ensures that any double-ring mode that may form upstream or downstream of the sound reducer is destroyed at least over the entire length of the sound reducer. Thus, that the entire length of the sound reducer can be utilized with good effect.

The internal structure of the flow-around body is irrelevant for the acoustic effect described in detail above. Nevertheless, the flow-around body may be hollow. The hollow flow-around body helps to save material and weight. Additionally, the hollow flow-around body may have at least one second window. The second window enables the interior of the hollow flow-around body to function as an additional resonance chamber that is connected in a sound-conducting manner to the interior of the main pipe. In other words, the flow-around body is used as a further resonator in addition to its explained mode-disturbing function. The sound transported between the flow-around body and the wall of the main pipe can thus penetrate both radially outwards through the first window into the annular chamber, and radially inwards through the second window into the interior of the flow-around body. Reflections of sound occur in both chambers and leads to a destructive superposition of sound waves of selected frequency ranges if the design and dimensioning are appropriate. In particular, due to the usually different dimensions of the interior of the annular chamber and the interior of the flow-around body interior, resonators can be created that are optimized to reduce different frequency ranges. The sound reduction potential of the sound reducer according to the invention is therefore further increased.

A resonance chamber provided by the flow-around body can be used as a pure resonator. However, a sound-reducing chamber in the flow-around body can operate on the principle of resonance and absorption, such as the assignee's RESABTOR® brand of sound reducer. For this purpose, the at least one second window may be filled with a second foam plate of preferably open-pored foam. The combined principle of resonance and absorption is described above with respect to the outer annular chamber.

An axially split flow-around body can be configured so that the at least one second window is formed as a second gap arranged between the two flow-around body axial sections and extending completely over the circumference of the flow-around body. In this embodiment, the two flow-around body axial sections do not contact each other directly, but are on gap. This gap can be bridged by a second hollow foam cylinder to provide sound reduction by both resonance and absorption, as with the assignee's RESABTOR® brand of sound reducer. In this embodiment, the second foam plate is formed as a second hollow foam cylinder of preferably open-pored foam bridging the second gap and held in a coaxial orientation between the two flow-around body axial sections. To fix the second hollow foam cylinder between the two flow-around body axial sections, the second hollow foam cylinder can be held on both axial sides in a form-fitting manner in respective annular grooves located in the end faces of the corresponding flow-around body section that is facing the second hollow foam cylinder. With regard to the resulting assembly process, analogous reference can be made to the above explanations in the context of the first hollow foam cylinder.

Instead of a second window completely surrounding the flow-around body, a plurality of second windows spaced apart in the circumferential direction can be provided, and may be filled by insertable second foam plates of preferably open-pored foam.

The two annular chamber axial sections may contact each other directly and may be connected to each other along a common contact line in an axially fixed manner, such as by a weld or other material bonding. Due to the one-piece nature of the sound reducer axial sections, such a radially outer and therefore easily accessible line of contact is sufficient to fix the two main pipe axial sections and two flow-around body axial sections in their relative alignment to each other. Also, no window is provided in the annular chamber to interrupt the line of connection between its two axial sections. Therefore, a direct connection between the two annular chamber axial sections is an ideal approach for joining the sound reducer axial sections.

Both annular chamber axial sections may be essentially symmetrical. However, this may pose problems in forming a secure and durable weld, particularly in the case of a thin-walled design. Therefore, in one embodiment, the first annular chamber axial section comprises a first annular chamber end wall and the second annular chamber axial section comprises a second annular chamber end wall as well as an annular chamber jacket adjoining the second annular chamber end wall and reaching axially to the first annular chamber end wall. The radially outer edge of the first annular chamber end wall and the free axial edge of the annular chamber jacket have contact structures at which the contact line is formed. Thus, in this embodiment, the entire annular chamber jacket is part to the second annular chamber axial section, while the first annular chamber axial section is substantially reduced to the first annular chamber end wall. The contact line between the two annular chamber axial sections thus runs along the outer edge of the first annular chamber end wall or along the axial edge of the annular chamber shell. This "corner" area is particularly easily accessible to a device used for welding. In addition, this area is stable in several directions, so that even high manufacturing tolerances do not stand in the way of forming a secure and tight joint.

The struts connecting the flow-around body to the main pipe preferably extend obliquely in the axial direction, the struts of the first set of struts and the struts of the second set of struts converge toward each other from radially outside to radially inside. The oblique position of the struts achieves axial stabilization of the flow-around body relative to the main pipe compared to struts running in a purely radial direction. The special choice of inclination also ensures that the struts can start axially outside the first window (in the main pipe) and do, despite their inclination, not extend farther axially outwards, which reduces the overall axial length of the sound reducer.

Further details and advantages of the invention will be apparent from the following specific description and drawings.

DETAILED DESCRIPTION

Identical reference signs in the figures indicate identical or analogous elements.

Figure 1:
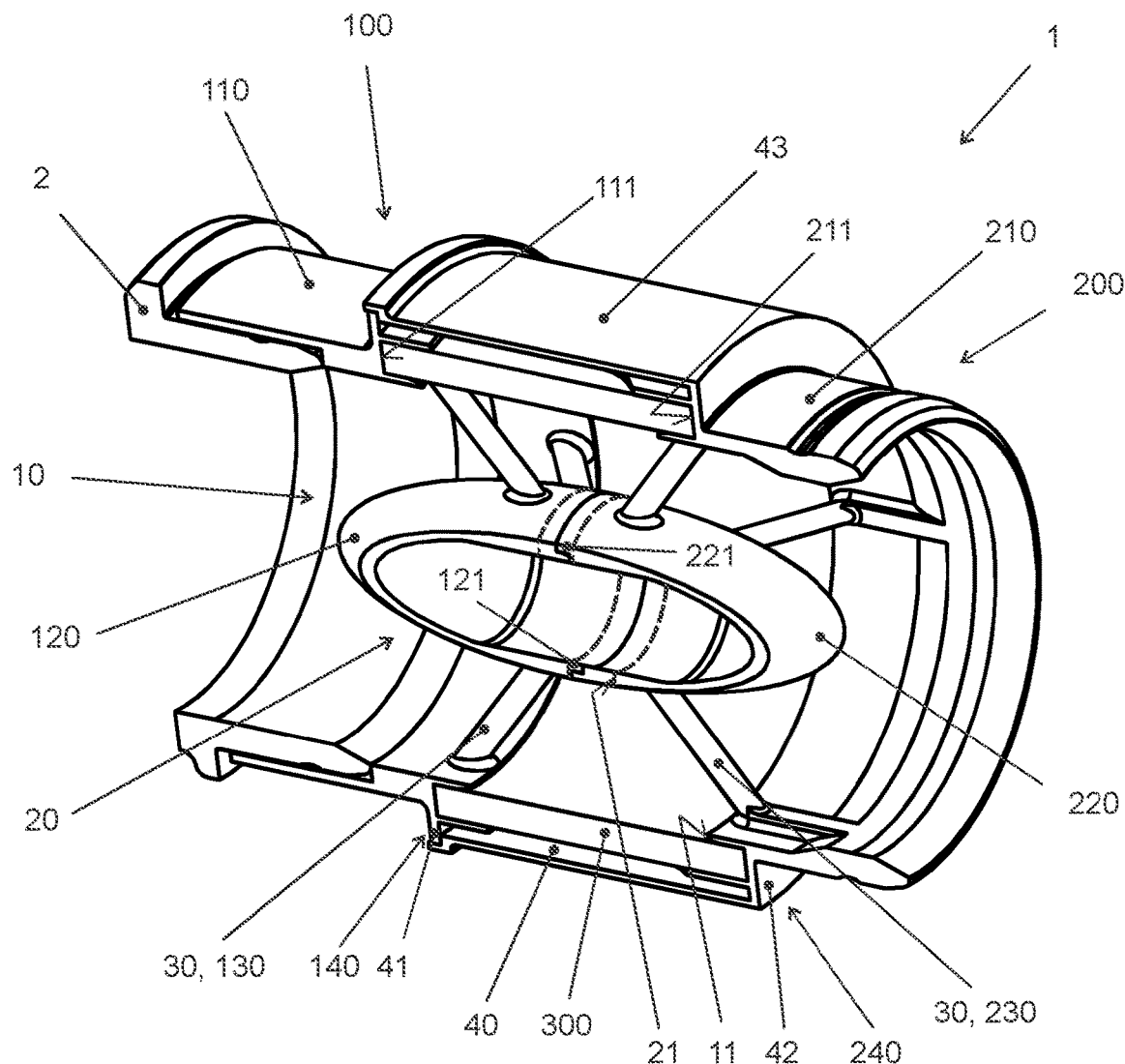
FIG. 1 perspective view of a sound reducer according to the invention cut parallel to its axis.
Figure 2:
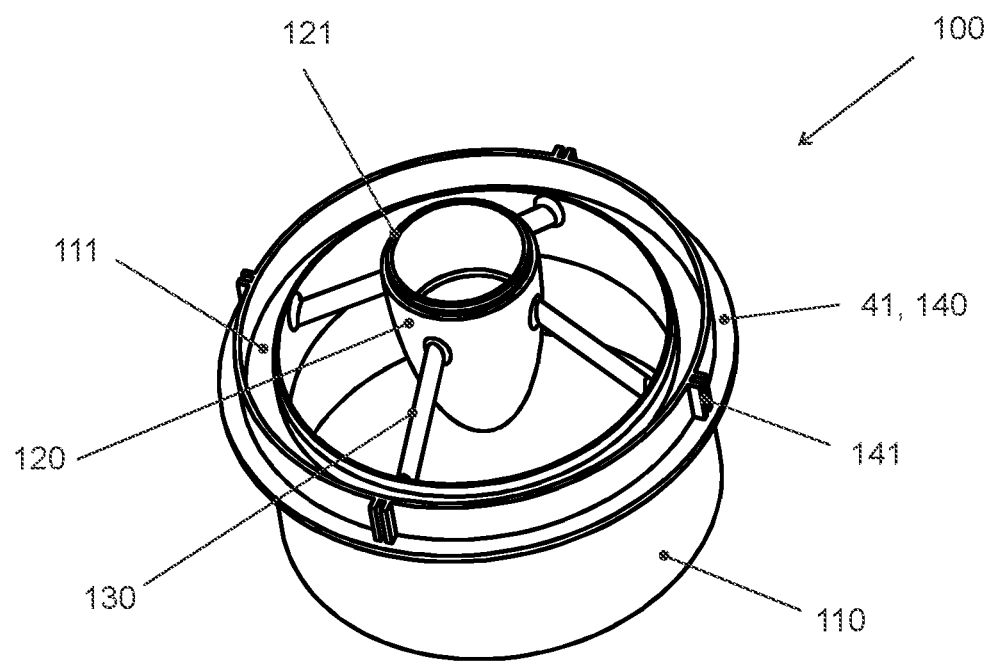
FIG. 2 is a perspective view of the first sound reducer axial section of the sound reducer of FIG. 1.
Figure 3:
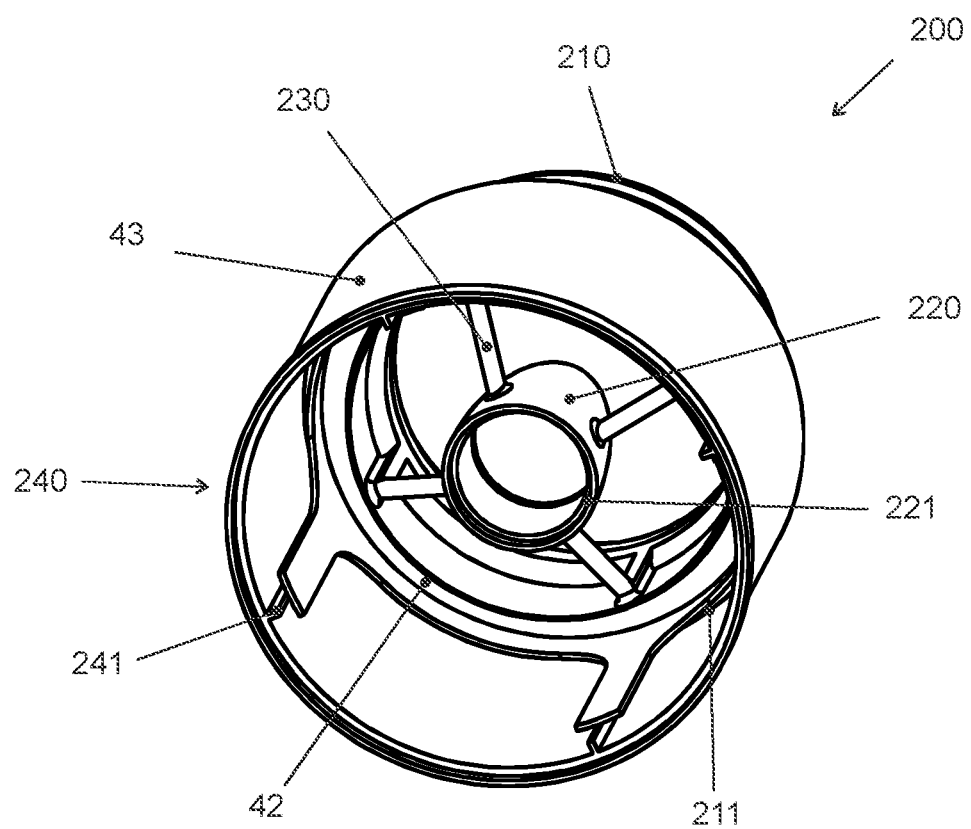
FIG. 3 is a perspective view of the second sound reducer axial section of the sound reducer of FIG. 1.

FIG. 1 is a perspective view of a sound reducer 1 according to an embodiment of the invention. The sound reducer 1 of FIG. 1 is cut parallel to the longitudinal axis. Additionally, the sound reducer 1 is shown in the assembled state and connected to a connection pipe 2. The sound reducer 1 of the illustrated embodiment is composed of three elements, namely a first sound reducer axial section 100, which is shown separately in FIG. 2, a second sound reducer axial section 200, which is shown separately in FIG. 3, and a hollow foam cylinder 300 that is inserted between the first and second sound reducer axial sections 100, 200 in the assembly shown in FIG. 1. Functionally, the sound reducer 1 comprises a main pipe 10 and a flow-around body 20 fixed coaxially inside the main pipe 10 via struts 30. The flow-around body 20 is shown as a rotational ellipsoid for illustrative purposes. However, some embodiments of the flow-around body 20 may have special streamlined designs that take into account a predominant flow direction of the fluid flowing through the main pipe 10. The struts 30 also may have profiles optimized with respect to low flow resistance.

A first window 11 is formed in the central region of the main pipe 10 and completely surrounds the main pipe 10. The first window of this embodiment is filled by a hollow foam cylinder 300. An annular chamber 40 surrounds the main pipe 10 at a position radially outward of the first window 11. The annular chamber 40 extends between a first annular chamber end wall 41 and a second annular chamber end wall 42 and is bounded radially outwardly by an annular chamber jacket 43. The main pipe 10 interacts with the annular chamber 40 via the first window 11 in a basically known manner as a sound-reducing resonator, with the hollow foam cylinder 300 achieving an additional sound-reducing absorption effect. The flow body arranged inside the main pipe 10 prevents the buildup of higher sound propagation modes by means of which this sound-reducing effect could be "circumvented".

With the exception of the hollow foam cylinder formed as a continuous individual part, all functional elements of the sound reducer 1 of this embodiment are built as assemblies of two axial sections. The respective axial sections of these elements are formed as two one-piece sound reducer axial sections 100, 200 shown separately in FIGS. 2 and 3. Thus, the main pipe 10 is composed of the first main pipe axial section 110 associated with the first sound reducer axial section 100 and the second main pipe axial section 210 associated with the second sound reducer axial section 200. The flow-around body 20 is composed of the first flow-around body axial section 120 associated with the first sound reducer axial section 100 and the second flow-around body axial section 220 associated with the second sound reducer axial section 200. Similarly, the set of struts 30 is divided into a first subset of struts 130 associated with the first sound reducer axial section 100 and a second subset of struts 230 associated with the second sound reducer axial section 200. Finally, the annular chamber 40 is composed of a first annular chamber axial section 140 associated with the first sound reducer axial section 100 and a second annular chamber axial section 240 associated with the second sound reducer axial section 200. While the first-mentioned elements are divided substantially symmetrically, this does not apply to the illustrated embodiment of the annular chamber 40. Here, the first annular chamber axial section 140 comprises essentially only the first annular chamber end wall 41, whereas the second annular chamber axial section 240 comprises the annular chamber jacket 43 in addition to the second annular chamber end wall 42.

The radially outer edge of the first annular chamber end wall 41 together with the free axial edge of the annular chamber shell 43 form a joining zone in which the two sound reducer axial sections 100, 200 can be joined by material bonding to form the assembled state shown in FIG. 1. The joining can be effected by welding and/or gluing to form a circumferential, annular welded or glued seam. For the rotationally correct alignment of the two sound reducer axial sections 100, 200, corresponding positive locking elements are provided in the area of the joining zone, which in the embodiment shown are designed as axial grooves 141 on the first sound reducer axial section 100 and corresponding axial bars 241 on the second sound reducer axial section 200.

The facing edges of the main pipe axial sections 110, 210 each have an associated annular groove 111, 211, in which the hollow foam cylinder is held in a form-fitting manner.

A radially effective form fit is provided between the flow-around body axial sections 120, 220 to make the flow-around body 20, which is hollow in the embodiment shown, largely tight against the fluid flowing around it in the operating state. Oppose edges of the flow-around body axial sections 120, 220 have corresponding annular shoulders 121, 221 that overlap one another in the assembled state, as shown in FIG. 1. The annular shoulders 121, 221 can be carriers of additional sealing means, for example an O-ring.

A possible further development of the invention is indicated by dashed lines in FIG. 1. In this case, the axial flow body sections 120, 220 do not contact each other directly. Instead, a second window 21 completely surrounds the flow-around body 20 and may be filled by a further hollow foam cylinder that is not shown. In such an embodiment, the interior of the hollow flow-around body 20 can be designed as an additional resonator chamber for reducing sound of frequencies that are not or only insufficiently influenced by the sound reduction effect in the outer annular chamber 40.

The embodiments discussed above and shown in the figures are only illustrative examples of the invention. The person skilled in the art is provided with a wide range of possible variations in light of the present disclosure. In particular, the choice of material of the sound reducer 1 can be adapted to the requirements of the individual case. For high-temperature use, a metallic material selection is recommended. In contrast, when used in lower temperature ranges, cost-effective plastic injection molding can be used. A typical application of the invention is noise reduction in exhaust gas lines or air supply lines of motor vehicles, in refrigerant lines of air conditioning systems or in other lines through which liquid or gaseous fluids flow.

LIST OF REFERENCE SIGNS 1 sound reducer
2 connection pipe
10 main pipe
11 window in 10/first window
20 circulation body
21 window in 20/second window
30 strut
40 ring chamber
41 first annular chamber end wall
42 second annular chamber end wall
43 annular chamber jacket
100 first sound reducer axial section
110 first main pipe axial section
111 annular groove in 110
120 first flow-around body axial section
121 annular shoulder in 120
130 strut
140 first annular chamber axial section
141 axial bar
200 second sound reducer axial section
210 second main pipe axial section
211 annular groove in 210
220 second flow around body axial section
221 annular shoulder of 220
230 strut
240 second annular chamber axial section
241 axial groove
300 hollow foam cylinder

The invention claimed is:

1. A sound reducer (1), comprising:
a first sound reducer axial section (100) comprising: a first annular chamber axial section (140), a first main pipe axial section (110) extending from the first annular chamber axial section (110), a first flow-around body axial section (120) inward of the first main pipe axial section (110) and first struts (130) extending integrally between the first main pipe axial section (110) and the first flow-around body axial section (120) to support the first flow-around body axial section (120) inward of the first main pipe axial section (110); and
a second sound reducer axial section (200) formed separately from the first sound reducer axial section (100) and comprising: a second annular chamber axial section (210), a second main pipe axial section (240) extending from the second annular chamber axial section (210), a second flow-around body axial section (220) inward of the second main pipe axial section (210) and second struts (230) extending integrally between the second main pipe axial section (210) and the second flow-around body axial section (220) and supporting the second flow-around body axial section (220) inward of the second main pipe axial section (210), wherein:
the first annular chamber axial section (140) is joined to the second annular chamber axial section (240) to form at least part of an annular chamber (40),
the first and second main pipe axial sections (110, 210) are connected respectively to the first and second annular chamber axial sections (140, 240) and form at least part of a main pipe (10) of the sound reducer (1) inward of the annular chamber (40),
a first window (11) in the main pipe (10) provides sound-conducting communication between the main pipe (10) and the annular chamber (40), and
ends of the first and second flow-around body axial sections (120, 220) are joined to form a flow-around body (20) in the main pipe (10).

2. The sound reducer (1) of claim 1, wherein each of the first and second sound reducer axial sections (100, 200) is a one-piece plastic injection-molded part.

3. The sound reducer (1) of claim 1, further comprising: a first foam material filling the at least one first window (11) of the main pipe (10).

4. The sound reducer (1) of claim 3, wherein the at least one first window (11) of the main pipe (10) is formed as a first gap arranged between the first and second main pipe axial sections (110, 210).

5. The sound reducer (1) of claim 4, wherein the foam material is a first hollow foam cylinder (300) bridging the first gap while being held coaxially between the first and second main pipe axial sections (110, 210).

6. The sound reducer (1) of claim 1, wherein the flow-around body (20) has a streamlined profile in a longitudinal section along the main pipe (10).

7. The sound reducer (1) of claim 5, wherein the first and second main pipe axial sections (110, 210) are formed respectively with first and second end faces that are opposed to one another, the first and second end faces being formed respectively with first and second annular grooves (111, 211), and the hollow cylinder (300) has opposite first and second axial ends that are held respectively in the first and second annular grooves (111, 211) in a form-fitting manner.

8. The sound reducer (1) of claim 1, wherein the ends of the first and second flow-around body axial sections (120, 220) have form-fit structures that fit together to define a form-fit connection of the first and second flow-around body axial sections (120, 220) to form the flow-around body (20).

9. The sound reducer (1) of claim 1, wherein the flow-around body (20) extends at least over an axial length of the annular chamber (40).

10. The sound reducer (1) of claim 1, wherein the flow-around body (20) has a hollow interior.

11. The sound reducer (1) of claim 10, wherein the flow-around body (20) has at least one second window (21) communicating with the hollow interior of the flow-around body (20) to define a resonance chamber that is connected in a sound-conducting manner to areas of the sound reducer (1) inward of the main pipe (10).

12. The sound reducer (1) of claim 11, wherein the at least one second window (21) is filled with a second foam material.

13. The sound reducer (1) of claim 11, wherein the at least one second window (21) is formed as a second gap arranged between the first and second flow-around body axial sections (120, 220) and extending completely over a circumference of the flow-around body (20).

14. The sound reducer (1) of claim 13, wherein the second foam material in the at least one second window (21) is formed as a second hollow foam cylinder bridging the second gap and held in coaxial orientation between the first and second flow-around body axial sections (120, 220).

15. The sound reducer (1) of claim 14, wherein the second hollow foam cylinder is held on both axial ends in a form-fitting manner in annular grooves located respectively in the end faces of the first and second flow-around body sections (120, 220).

16. The sound reducer (1) of claim 1, wherein the first and second annular chamber axial sections (140, 240) contact each other directly and are connected to each other along a common contact line in an axially fixed manner.

17. The sound reducer (1) of claim 16, wherein the first annular chamber axial section (140) comprises a first annular chamber end wall (41) and the second annular chamber axial section (240) comprises a second annular chamber end wall (42), an annular chamber jacket (43) adjoining said second annular chamber end wall (42) and reaching axially to the first annular chamber end wall (41), a radially outer edge of the first annular chamber end wall (41) and a free axial edge of the annular chamber jacket (43) having contact structures at which the contact line is formed.

18. The sound reducer (1) of claim 1, wherein the struts (30; 130, 230) extend oblique to an axial direction of the main pipe (10), the first struts (130) and the second struts (230) converging towards each other from radially outside to radially inside.

* * * * *